United States Patent
Balus et al.

(10) Patent No.: US 9,331,940 B2
(45) Date of Patent: May 3, 2016

(54) SYSTEM AND METHOD PROVIDING DISTRIBUTED VIRTUAL ROUTING AND SWITCHING (DVRS)

(71) Applicant: Alcatel Lucent, Boulogne-Billancourt (FR)

(72) Inventors: Florin S Balus, Mountain View, CA (US); Suresh Boddapati, Mountain View, CA (US); Sunil S Khandekar, Mountain View, CA (US); Dimitrios Stiliadis, Mountain View, CA (US)

(73) Assignee: Alcatel Lucent, Boulogne-Billancourt (FR)

( * ) Notice: Subject to any disclaimer, the term of this patent is extended or adjusted under 35 U.S.C. 154(b) by 85 days.

(21) Appl. No.: 13/841,162

(22) Filed: Mar. 15, 2013

(65) Prior Publication Data

US 2014/0064283 A1 Mar. 6, 2014

Related U.S. Application Data

(60) Provisional application No. 61/693,996, filed on Aug. 28, 2012.

(51) Int. Cl.
*H04L 12/741* (2013.01)
*H04L 12/931* (2013.01)
(Continued)

(52) U.S. Cl.
CPC ............... *H04L 45/745* (2013.01); *H04L 45/38* (2013.01); *H04L 45/64* (2013.01); *H04L 49/70* (2013.01)

(58) Field of Classification Search
CPC ......... H04L 45/42; H04L 45/44; H04L 45/64; H04L 45/745; H04L 49/07
USPC ................................................ 370/351, 392
See application file for complete search history.

(56) References Cited

U.S. PATENT DOCUMENTS

| 7,330,461 B2 | 2/2008 | Windecker |
| 8,407,366 B2 | 3/2013 | Alkhatib et al. |

(Continued)

FOREIGN PATENT DOCUMENTS

| EP | 2 343 648 A1 | 7/2011 |
| EP | 2355423 A1 | 8/2011 |

(Continued)

OTHER PUBLICATIONS

International Search Report and Written Opinion for International Patent Application Serial No. PCT/US2013/054963, mailed Nov. 25, 2013, consists of 11 unnumbered pages.

(Continued)

*Primary Examiner* — Gary Mui
(74) *Attorney, Agent, or Firm* — Wall & Tong LLC

(57) ABSTRACT

Systems, methods, architectures and/or apparatus for providing a distributed Virtual Routing and Switching (dVRS) solution at a data center (DC) by logically representing the networking resources of the data center as a plurality of virtual nodes, each virtual node comprising an IP infrastructure based on a physical network node and a plurality of virtual switches, each virtual switch including a VRS instance linked to one or more VRS instances at other virtual switches via a VLAN to provide thereby a virtual service, wherein the physical network node performs control plane processing and provides to each virtual switch the specific routing information associated with the local services of that virtual switch. Thus, from a data plane perspective the virtual switches route and/or switch traffic directly to tunnels pointing to remote VRS instances without involving the Controller in the forwarding of the packets.

16 Claims, 7 Drawing Sheets

(51) Int. Cl.
*H04L 12/715* (2013.01)
*H04L 12/721* (2013.01)

(56) References Cited

U.S. PATENT DOCUMENTS

| | | | |
|---|---|---|---|
| 8,813,174 B1 | 8/2014 | Koeten | |
| 8,937,862 B2 | 1/2015 | Aybay et al. | |
| 2005/0013295 A1 | 1/2005 | Regan et al. | |
| 2009/0097406 A1* | 4/2009 | Nilakantan et al. | 370/235 |
| 2010/0046531 A1 | 2/2010 | Louati et al. | |
| 2011/0032843 A1* | 2/2011 | Papp et al. | 370/254 |
| 2011/0119729 A1 | 5/2011 | Bergeson et al. | |
| 2011/0185063 A1 | 7/2011 | Head et al. | |
| 2011/0261828 A1 | 10/2011 | Smith | |
| 2011/0299537 A1* | 12/2011 | Saraiya et al. | 370/392 |
| 2011/0317559 A1* | 12/2011 | Kern et al. | 370/235 |
| 2012/0324442 A1* | 12/2012 | Barde | 718/1 |
| 2013/0019277 A1 | 1/2013 | Chang et al. | |
| 2013/0086236 A1 | 4/2013 | Baucke et al. | |
| 2013/0094350 A1* | 4/2013 | Mandal et al. | 370/217 |
| 2013/0136133 A1 | 5/2013 | Alkhatib et al. | |
| 2013/0163606 A1 | 6/2013 | Bagepalli et al. | |
| 2013/0173810 A1* | 7/2013 | Subramaniam | 709/227 |
| 2013/0227561 A1 | 8/2013 | Walsh et al. | |
| 2013/0268588 A1 | 10/2013 | Chang et al. | |
| 2013/0322446 A1 | 12/2013 | Biswas et al. | |
| 2014/0003232 A1* | 1/2014 | Guichard et al. | 370/230 |
| 2014/0013324 A1* | 1/2014 | Zhang et al. | 718/1 |
| 2014/0023074 A1* | 1/2014 | Mishra et al. | 370/390 |
| 2014/0050091 A1* | 2/2014 | Biswas et al. | 370/235 |
| 2014/0050218 A1* | 2/2014 | Kamble et al. | 370/392 |
| 2014/0164624 A1 | 6/2014 | Ames et al. | |

FOREIGN PATENT DOCUMENTS

| | | |
|---|---|---|
| JP | 2012065015 A | 3/2012 |
| WO | WO 2008/054997 A2 | 5/2008 |
| WO | 2009/144822 A1 | 12/2009 |

OTHER PUBLICATIONS

International Search Report and Written Opinion for International Patent Application Serial No. PCT/US2013/054765, mailed Nov. 25, 2013, consists of 11 unnumbered pages.

Evolving a network for a data center, new technology "Ethernet Fabric Bridge", Part. 3 Achieving Multipath by functional separation, Nikkei Network, vol. 146, May 28, 2012, pp. 59-63.

Effort for SDN by enterprises becoming clear, Nikkei Communication, vol. 575, Dec. 1, 2011, pp. 41-47.

Yuta Ashida et al., "A hierarchical control method with domain aggregation on OpenFlow networks," The Institute of Electronics, Information and Communication Engineers Technical Report, Apr. 12, 2012, vol. 112, No. 10, pp. 35-40.

* cited by examiner

SYSTEM AND METHOD PROVIDING DISTRIBUTED VIRTUAL ROUTING AND SWITCHING (DVRS)

CROSS-REFERENCE TO RELATED APPLICATION

Applicants claim the benefit of prior provisional patent application Ser. No. 61/693,996, filed Aug. 28, 2012 and entitled SYSTEM, METHOD AND APPARATUS FOR DATA CENTER AUTOMATION, which application is incorporated herein by reference in its entirety.

FIELD OF THE INVENTION

The invention relates to the field of communication networks and secure data centers connected thereby.

BACKGROUND

Data Center (DC) architecture generally consists of a large number of compute and storage resources that are interconnected through a scalable Layer-2 or Layer-3 infrastructure. In addition to this networking infrastructure running on hardware devices the DC network includes software networking components (vswitches) running on general purpose computer, and dedicated hardware appliances that supply specific network services such as load balancers, ADCs, firewalls, IPS/IDS systems etc. The DC infrastructure can be owned by an Enterprise or by a service provider (referred as Cloud Service Provider or CSP), and shared by a number of tenants. Compute and storage infrastructure are virtualized in order to allow different tenants to share the same resources. Each tenant can dynamically add/remove resources from the global pool to/from its individual service.

DC network must be able to dynamically assign resources to each tenant while maintaining strict performance isolation between different tenants (e.g., different companies). Furthermore, tenants can be sub-divided into sub-tenants (e.g., different corporate departments) with strict isolation between them as well. For example, an enterprise requires resources in a CSP DC that are partitioned between different departments.

Data Center (DC) network infrastructure is designed to provide connectivity service between the outside world and different compute and storage resources, such as IP hosts (e.g. VMs on server blades or bare metal servers), associated storage and service appliances (FW, LB, NAT). From a basic connectivity perspective this is usually implemented using a set of VLANs (L2) interconnected via IP routers (L3). As Cloud Providers are trying to increase their revenues by expanding their scope to address more and more customers, there is a need to move away from basic VLANs and shared IP routing context to a more scalable architecture.

SUMMARY

Various deficiencies in the prior art are addressed by systems, methods, architectures and/or apparatus for providing a distributed Virtual Routing and Switching (dVRS) solution at a data center (DC) by logically representing the networking resources of the data center as a plurality virtual nodes, each virtual node comprising an IP infrastructure based on a physical network node and a plurality of virtual switches, each virtual switch including a VRS instance linked to one or more VRS instances at other virtual switches via a VLAN to provide thereby a virtual service, wherein the physical network node performs control plane processing and provides to each virtual switch the specific routing information associated with the local services of that virtual switch. Thus, from a data plane perspective the virtual switches route and/or switch traffic directly to tunnels pointing to remote VRS instances without involving the Controller in the forwarding of the packets.

For example, a method according to one embodiment for providing virtualized services at a data center (DC) comprises: establishing a plurality of virtual nodes (VNs), each VN comprising a controller, an IP infrastructure and a plurality of virtual switches (VSWs); each VSW being programmed to support a Virtual Routing and Switching (VRS) instance and for storing forwarding information therefore, wherein a virtualized service is provided via a collection of VRS instances interconnected using IP tunnels and L2 or L3 service encapsulations, each controller being adapted to receive virtualized service route information from one or more DC gateways, other remote controllers and from local VSW, to process the required forwarding information base (FIB) and to download toward each VSW a corresponding FIB portion.

BRIEF DESCRIPTION OF THE DRAWINGS

The teachings herein can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTION

The invention will be discussed within the context of systems, methods, architectures and/or apparatus providing distributed Virtual Routing and Switching (dVRS) with L2/L3 multi-tenancy and generic tunneling. However, it will be appreciated by those skilled in the art that the invention has broader applicability than described herein with respect to the various embodiments.

In addition, while the various embodiments are discussed within the context of specific equipment configurations, protocols, mechanisms and the like, more and different equipment configurations, protocols, mechanisms and the like are also contemplated by the inventors as being applicable for use within the various embodiments. For example, various embodiments will be described within the context of a data center (DC) equipment rack comprising a centralized controller running on a VM or in the ToR control plane module and one or more physical servers or server elements.

Generally speaking, each of the physical servers or server elements comprises a host machine upon which virtual services utilizing compute/storage resources are instantiated by a hypervisor or virtual machine monitor (VMM) running on, or associated with, the server. The hypervisor comprises a software, hardware or combination of software and hardware adapted to instantiate, terminate and otherwise control one or more virtualized service on a server. In various embodiments, the server associated with a single rack are collectively operative to support the instantiation of, illustratively, 40 virtual switches (VSWs). It will be appreciated that more or fewer servers, instantiated switches and the like may be provided within a particular equipment rack or cluster within the DC. As such, the specification figures at times indicates that 40 communication paths are being utilized for a particular function. As will be readily appreciated, more or fewer than 40 communication paths may be used, more or fewer VSWs be used and so on.

Virtualized services as discussed herein generally described any type of virtualized compute and/or storage resources capable of being provided to a tenant. Moreover, virtualized services also include access to non-virtual appliances or other devices using virtualized compute/storage resources, data center network infrastructure and so on.

Figure 1:
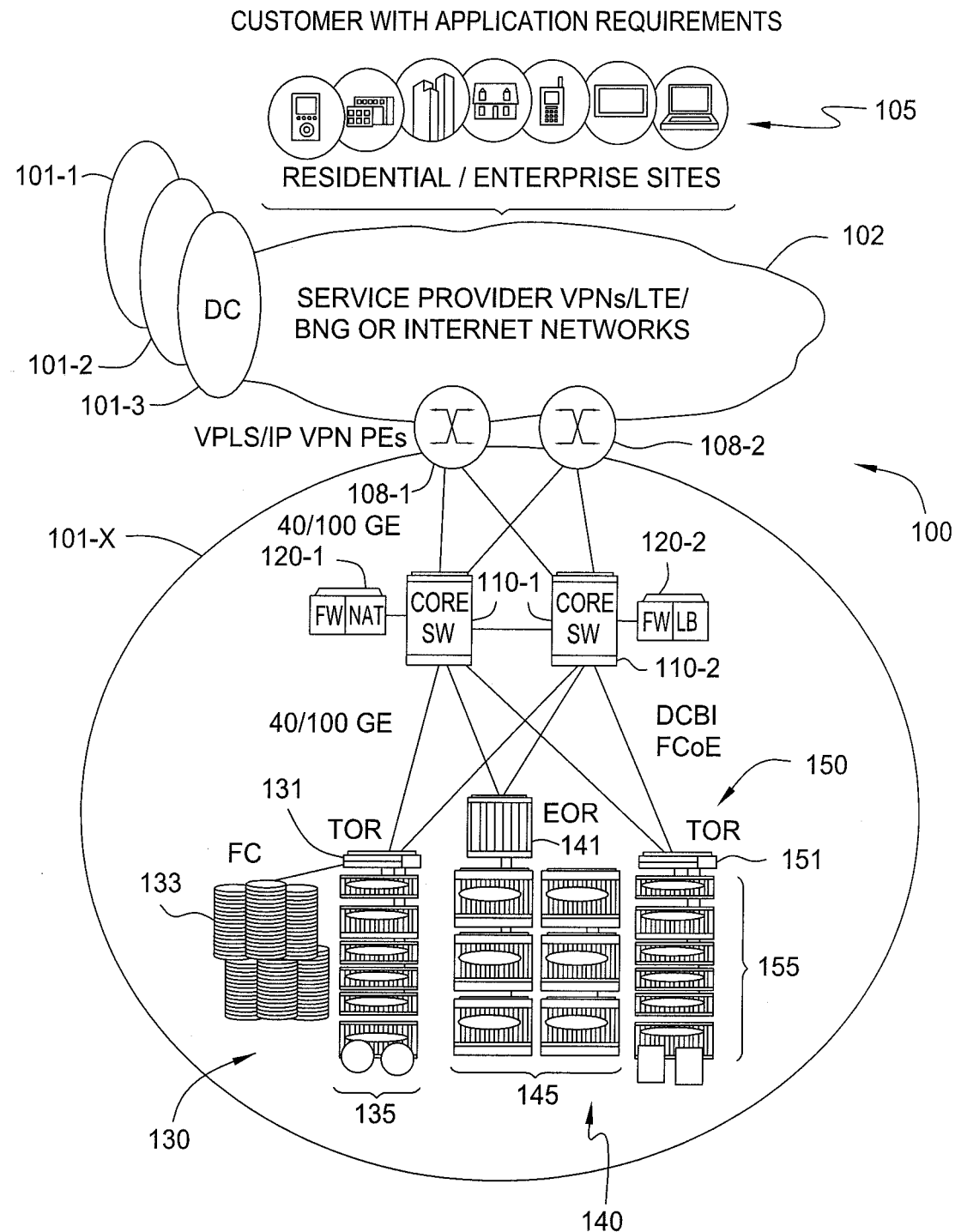
FIG. 1 depicts a high-level block diagram of a system benefiting from various embodiments.

FIG. 1 depicts a high-level block diagram of a system benefiting from various embodiments. Specifically, FIG. 1 depicts a system 100 comprising a plurality of data centers (DC) 101-1 through 101-X (collectively data centers 101) operative to provide compute and storage resources to numerous customers having application requirements at residential and/or enterprise sites 105 via one or more networks 102.

The customers having application requirements at residential and/or enterprise sites 105 interact with the network 102 via any standard wireless or wireline access networks to enable local client devices (e.g., computers, mobile devices, set-top boxes (STB's), storage area network components, Customer Edge (CE) routers, access points and the like) to access virtualized compute and storage resources at one or more of the data centers 101.

The networks 102 may comprise any of a plurality of available access network and/or core network topologies and protocols, alone or in any combination, such as Virtual Private Networks (VPNs), Long Term Evolution (LTE), Border Network Gateway (BNG), Internet networks and the like.

The various embodiments will generally be described within the context of Multi-Protocol Label Switching (MPLS) networks implementing either IP VPN or VPLS (Virtual Private LAN Services) wherein various Layer 3 or Layer 2 services are emulated over an MPLS backbone by encapsulating the Protocol Data Units (PDU) and transmitting them over secure tunnel between provider edge (PE) nodes 108. Each of the PE nodes 108 may support multiple data centers 101. That is, the two PE nodes 108-1 and 108-2 depicted in FIG. 1 as communicating between networks 102 and DC 101-X may also be used to support a plurality of other data centers 101.

The data center 101 (illustratively DC 101-X) is depicted as comprising a plurality of core switches 110, a plurality of service appliances 120, a first resource cluster 130, a second resource cluster 140, and a third resource cluster 150.

Each of, illustratively, two PE nodes 108-1 and 108-2 is connected to each of the illustratively, two core switches 110-1 and 110-2. More or fewer PE nodes 108 and/or core switches 110 may be used; redundant or backup capability is typically desired. The PE routers 108 interconnect the DC 101 with the networks 102 and, thereby, other DCs 101 and end-users 105. The DC 101 is generally organized in cells, where each cell can support thousands of servers and virtual machines.

Each of the core switches 110-1 and 110-2 is associated with a respective (optional) service appliance 120-1 and 120-2. The service appliances 120 are used to provide higher layer networking functions such as providing firewalls, performing load balancing tasks and so on.

The resource clusters 130-150 are depicted as compute and/or storage resources organized as racks of servers implemented either by multi-server blade chassis or individual servers. Each rack holds a number of servers (depending on the architecture), and each server can support a number of processors. A set of Ethernet connections connect the servers with either a Top-of-Rack (ToR) or End-of-Rack (EoR) switch. While only three resource clusters 130-150 are shown herein, hundreds or thousands of resource clusters may be used. Moreover, the configuration of the depicted resource clusters is for illustrative purposes only; many more and varied resource cluster configurations are known to those skilled in the art. In addition, specific (i.e., non-clustered) resources may also be used to provide compute and/or storage resources within the context of DC 101.

Exemplary resource cluster 130 is depicted as including a ToR switch 131 in communication with a mass storage device(s) or storage area network (SAN) 133, as well as a plurality of server blades 135 adapted to support, illustratively, virtual machines (VMs). Exemplary resource cluster 140 is depicted as including a EoR switch 141 in communication with a plurality of discrete servers 145. Exemplary resource cluster 150 is depicted as including a ToR switch 151 in communication with a plurality of virtual switches 155 adapted to support, illustratively, the VM-based appliances.

In various embodiments, the ToR/EoR switches are connected directly to the PE routers 108. In various embodiments, the core or aggregation switches 120 are used to connect the ToR/EoR switches to the PE routers 108. In various embodiments, the core or aggregation switches 120 are used to interconnect the ToR/EoR switches. In various embodiments, direct connections may be made between some or all of the ToR/EoR switches.

Thus, a rack having 41 network elements (ToR switch plus 40 virtual switches) is represented as a single network element; namely, the ToR switch. As will be discussed in more detail below, a VirtualSwitch Control Module (VCM) running in the ToR switch gathers connectivity, routing, reachability and other control plane information from other routers and network elements inside and outside the DC. The VCM may run also on a VM located in a regular server. The VCM then programs each of the virtual switches with the specific routing information relevant to the virtual machines (VMs) associated with that virtual switch. This programming may be performed by updating L2 and/or L3 forwarding tables or other data structures within the virtual switches. In this manner, traffic received at a virtual switch is propagated from a virtual switch toward an appropriate next hop over a tunnel between the source hypervisor and destination hypervisor using an IP tunnel. The ToR switch performs just tunnel forwarding without being aware of the service addressing.

Generally speaking, the "end-users/customer edge equivalents" for the internal DC network comprise either VM or server blade hosts, service appliances and storage areas. Similarly, the data center gateway devices (e.g., PE servers 108) offer connectivity to the outside world; namely, Internet, VPNs (IP VPNs/VPLS/VPWS), other DC locations, Enterprise private network or (residential) subscriber deployments (BNG, Wireless (LTE etc), Cable) and so on.

Distributed Virtual Routing and Switching (dVRS)

Various embodiments operate to implement a distributed Virtual Routing and Switching (dVRS) solution adapted to improving data center management and service delivery capabilities. Briefly, the dVRS solution provides one or more of the following benefits or features: (1) Simplified service delivery; namely, a single solution for L2, L3 and/or L4 multi-tenancy; (2) Optimized solution for intra-DC traffic, such as by VXLAN or NVGRE service encapsulation over IP tunneling and for inter-DC traffic, such as by VPN service encapsulation; (3) Interoperable with Internet/IP VPN gateways, such as DC GWs from ALU (e.g., Alcatel-Lucent's 7750 Service Router), Cisco, Juniper etc.; (4) May use standard IP (GRE) or MPLS tunneling, standard BGP and IGP control plane; (5) Scalable Multi-tenancy supporting 100K+ tenants; (6) Intra-DC (East-West) traffic may avoid transit of DC GW routers/PEs; (7) Avoids traffic tromboning and triangular routing by providing to every Vswitch 5-tuple flow information required to perform optimized traffic steering; and (8) Provides a reliable solution for VM Mobility: scalable auto-move of service connectivity tracking the VM events for Intra-DC and Inter-DC moves.

Generally speaking, a dVRS solution according to the various embodiments comprises a collection of Virtual Routing and Switching (VRS) instances running in each of a plurality of participating virtual nodes. The VRS instances may perform either L2 and/or L3 forwarding. They are used to handle intra-DC traffic or to send external traffic directly to the DC GWs, such as DC GWs using VPN Routing and Forwarding (VRF) tables.

Each virtual node may be formed using a controller (implementing the control and management plane functions) and various vSwitches implementing the forwarding function which interconnects compute resources (VMs) between themselves and with the external domains; these and other embodiments may be modified to utilize other forwarding elements (ToR GW instead of Vswitches) and attached devices (for example service appliance, bare metal servers instead of VMs).

Virtual Nodes

Figure 2:
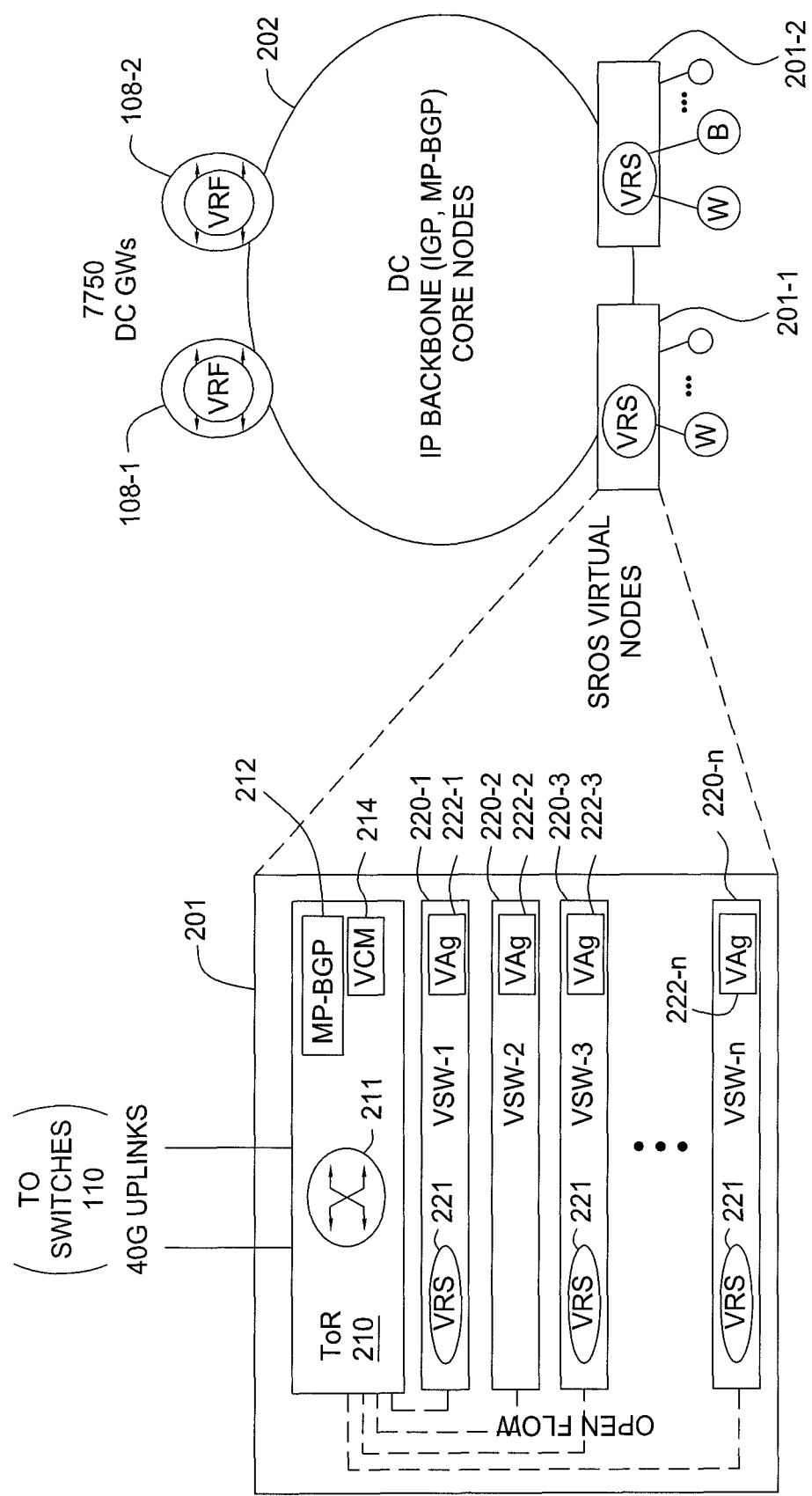
FIG. 2 depicts a high-level block diagram of an embodiment of virtual routing and switching (VRS) and a virtual node.

FIG. 2 depicts a high-level block diagram of an embodiment of a virtual routing and switching (VRS) element. In particular, FIG. 2 depicts a plurality of virtual nodes 201 in communication with one or more data center gateway devices (DC GWs) 108 via a data center IP backbone (e.g., IGP, MP-BGP) supported by various core nodes, routers and the like (e.g., core switches, ToR/EoR switches and the like).

A virtual node is formed utilizing the physical resources associated with one or more resource clusters such as described above with respect to FIG. 1.

Virtual Node (VN) 201 comprises an IP infrastructure implemented on DC device such as a ToR (or EoR) 210 in communication with a plurality of virtual switches (VSWs) 220-1 through 220-n, instantiated on one or more server elements, such as discrete servers, server blades and the like.

The ToR comprises a physical device providing, illustratively, a high-density 10G/40G/100G Ethernet aggregation solution. The ToR includes a Control Plane Interaction Module (CPIM) 212 and a VirtualSwitch Control Module (VCM) 214. The same modules may run in a centralized Controller running on a VM in a server. All the description for the ToR based modules applies also to the VM case.

The CPIM 212 uses, illustratively, multiprotocol BGP (MP-BGP) to provide control plane interaction between the ToR and other switches, routers, network elements and the like within the DC and/or outside of the DC to gather thereby routing information, reachability information, connectivity information and other control plane information associated with the virtualized services supported by the VSWs 220.

The virtual switches (VSWs) 220 are implemented via a hypervisor function executed at one or more physical host servers (not shown), such as when virtualized networking is deployed. Each VSW 220 is associated with a v-switch agent (VAg) that may be executed within the same hypervisor as the VSW 220 or via application programming interfaces (APIs) provided by the hypervisor.

The VCM 214 controls all of the virtual switches (VSWs) 220 attached to the ToR 210. The VCM 214 may provide an interface that allows network administrators to monitor and modify the behavior of the corresponding VSWs 220. The VCM 214 also includes all necessary protocol capabilities that will enable the VSWs 220 and ToR 210 to operate as a virtual node.

For example, the VSWs 220 perform the VRS tunnel encapsulation and handle the forwarding for every VRS instance related to that Vswitch. The forwarding is based on FIB entries downloaded via a communication path between the VCM 214 and the VAg 220 of the VSW 220.

As depicted in FIG. 2, a CPIM 212 is using BGP to exchange route, reachability and other control plane information with other CPIM modules or with DC GW PEs. and learns about local information from VCM 214. The CPIM 212 module generates then a Routing Information Base and per tenant FIBs. VCM 214 uses then Open Flow to download forwarding tables (forwarding information bases) entries in the VSWs 220 for virtual services.

A dVRS data plane VRS 221 is running in each participating VSW 220 (i.e., 220-1, 220-3 ... 220-n) while the ToR 210 is performing only IP forwarding using the outer IP tunnel header.

Every VRS instance performs IP and/or MAC lookup as the frames are arriving from the Vswitch uplink or from a local VM. If the lookup results in a next hop pointing to a core tunnel, various embodiments support multiple tunnel encapsulations to accommodate Intra-DC optimizations and DC gateway interoperability.

Figure 3:
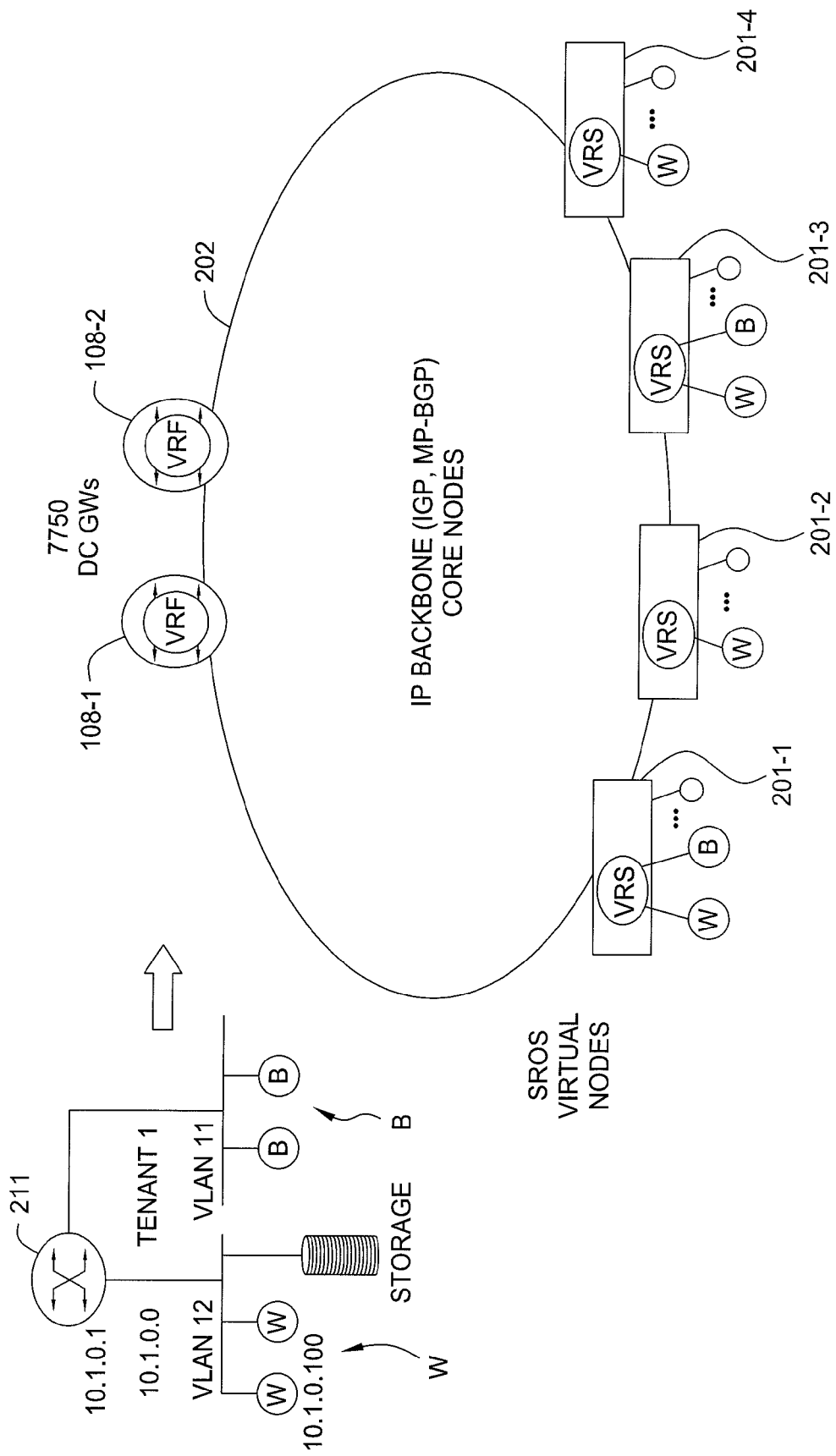
FIG. 3 graphically depicts an exemplary mapping of a Tenant L2 and L3 service topology to a dVRS connected to an IP VPN service on DC GW PEs according to an embodiment.

FIG. 3 graphically depicts an exemplary virtualization supporting resource allocations to a tenant according to an embodiment. In operation, each tenant requires one or a combination of virtualized L2 (ELAN) and/or L3/IP (VRF) services.

Referring to FIG. 3, a "Tenant 1" requires DC resources for two applications; namely, a business logic application B and a web application W. Each of the applications (B and W) is assigned to a VM group interconnected using, illustratively, a L2 segment or VLAN Specifically, the business logic application B is assigned to a first VLAN (VLAN 11), while the web application W is assigned to a second VLAN (VLAN 12).

As depicted in FIG. 3, an IP address of 10.1.0.0 is associated with Tenant 1, an IP address of 10.1.0.1 is associated with the Tenant 1 Router GW 211, and an IP address of 10.1.0.100 is associated with the Tenant 1 web server.

As further depicted in FIG. 3, and as described above, each of the VLANs (VLAN 11, VLAN 12) and the router 211 are emulated using a respective dVRS (VRS) data plane 221 running participating VSWs 220 of the virtual nodes 201. Every VRS instance performs IP and/or MAC lookup as the frames are arriving from the core or access side of the VLAN and performs routing functions accordingly. The VRS instance will create tunnels directly between the hypervisors and based on the lookup (IP or MAC), it will encapsulate the packet in a corresponding tunnel and forward it directly to the destination hypervisor.

To achieve this, the VRS instance requires routing information. This is retrieved by utilizing a routing protocol between the different VRS instances. In order for the VRS instance to communicate with the public Internet, it learns that for specific routes it must forward the traffic to the VRF (108-1) and it will encapsulate the packets into a tunnel with destination the corresponding VRF and forward the packets to this VRF over the IP core network.

It is noted that the logical representation of service connectivity is provided by L2 and/or L3 per-tenant instances that may be distributed in a number of Vswitches.

Figure 4:
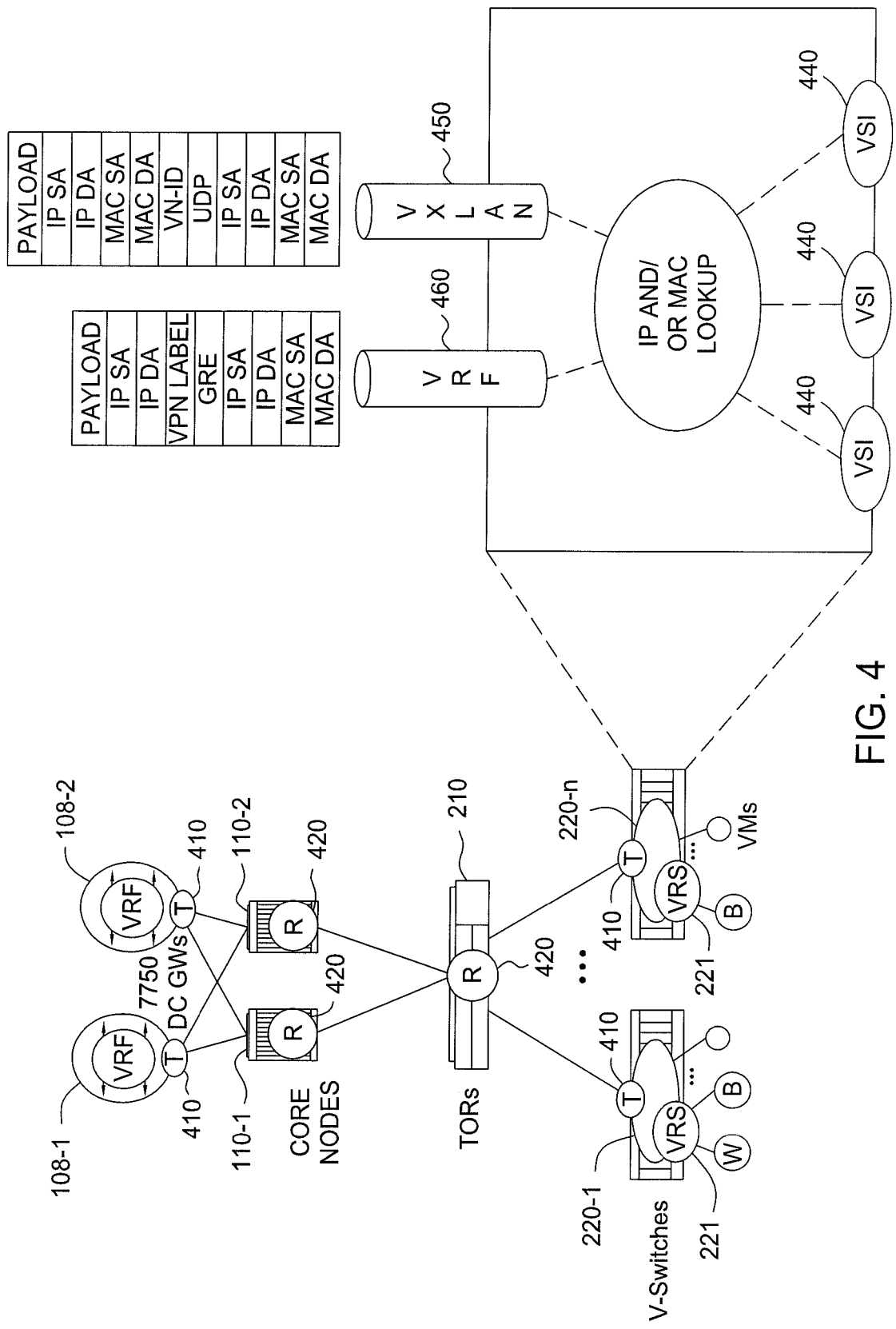
FIG. 4 graphically depicts dVRS forwarding and tunneling details for a VRS instance according to an embodiment.
Figure 5:
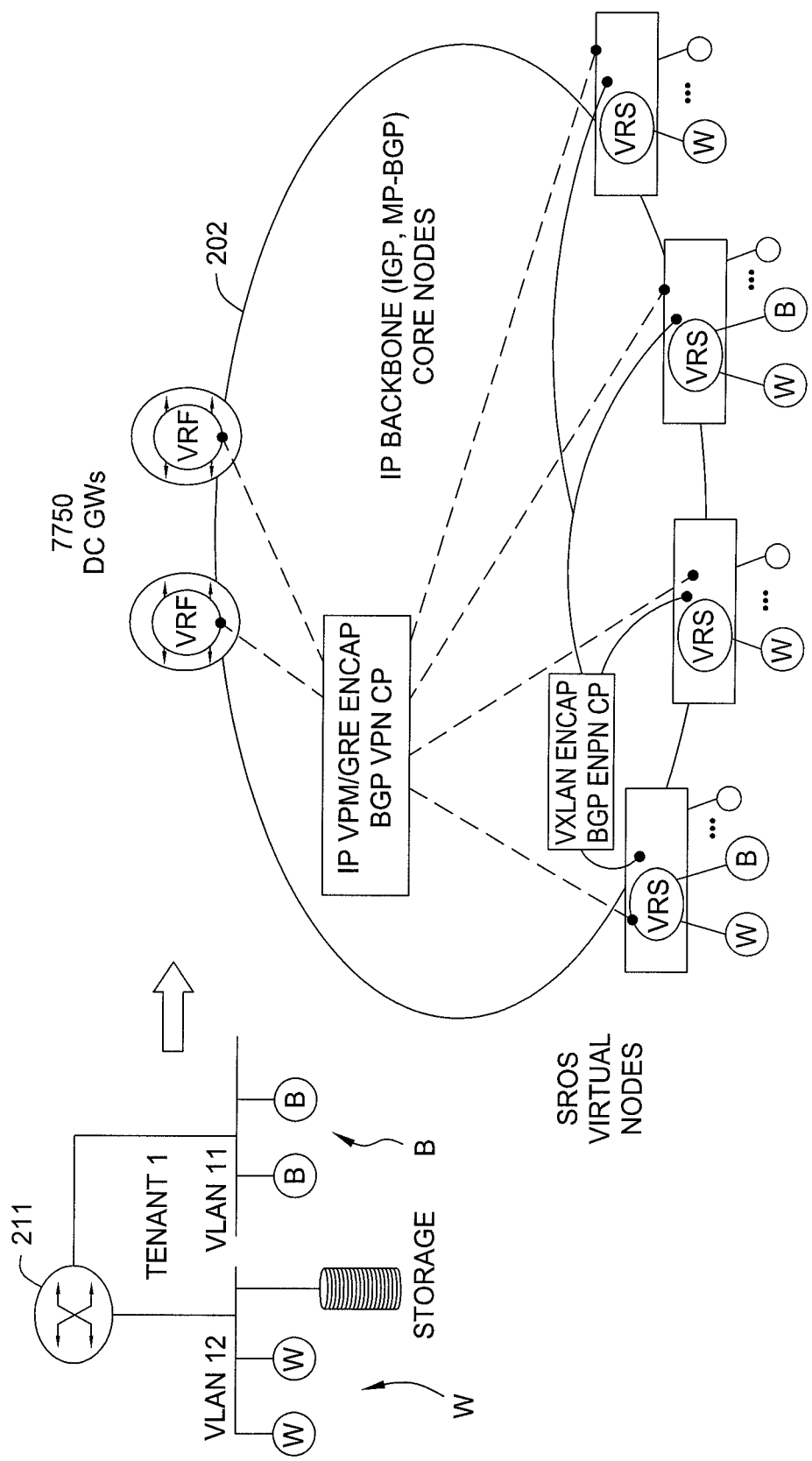
FIG. 5 graphically depicts a high level network view of the dVRS forwarding and tunneling of FIG. 4.

FIG. 4 graphically depicts a VRS forwarding and tunneling mechanism according to an embodiment. Specifically, FIG. 4 depicts a dVRS forwarding and tunneling mechanism applied to, illustratively, the Tenant 1 requirements discussed above with respect to FIG. 3. It is noted that VMs denoted as "W" run Web applications, while VMs denoted as "B" run Business Logic applications Referring to FIG. 4, a VSI (Virtual Switch Interface) represents the interface of the VRS where a given Virtual Machine is attached to. The VRS interconnects virtual machines local or located in other Vswitches between themselves and with the outside world. For Intra-DC destinations it provides forwarding using, illustratively, Virtual eXtensible LAN (VXLAN) service encapsulation and IP tunneling 450, and for forwarding to external DC destinations through the DC GWs using, illustratively, MPLS over Generic Routing Encapsulation (GRE) 460. Specifically, it can be seen that various tunneling endpoints 410 (T) are found at the VSWs 220 and DC GWs 108. Further, the IP routing context 420 (R) running in TORs 210 and core nodes 110 provides the tunnel forwardin required to transport the packets between different service termination points.

Use Cases

There are a number of use cases addressed by the above-described dVRS solutions, such as (1) Optimal handling of inter-subnet East-West traffic; (2) Addressing traffic tromboning issues; (3) Interoperability with existing VPN solutions for L2/L3 services; and (4) generic VM Mobility at L2/L3.

Figure 6:
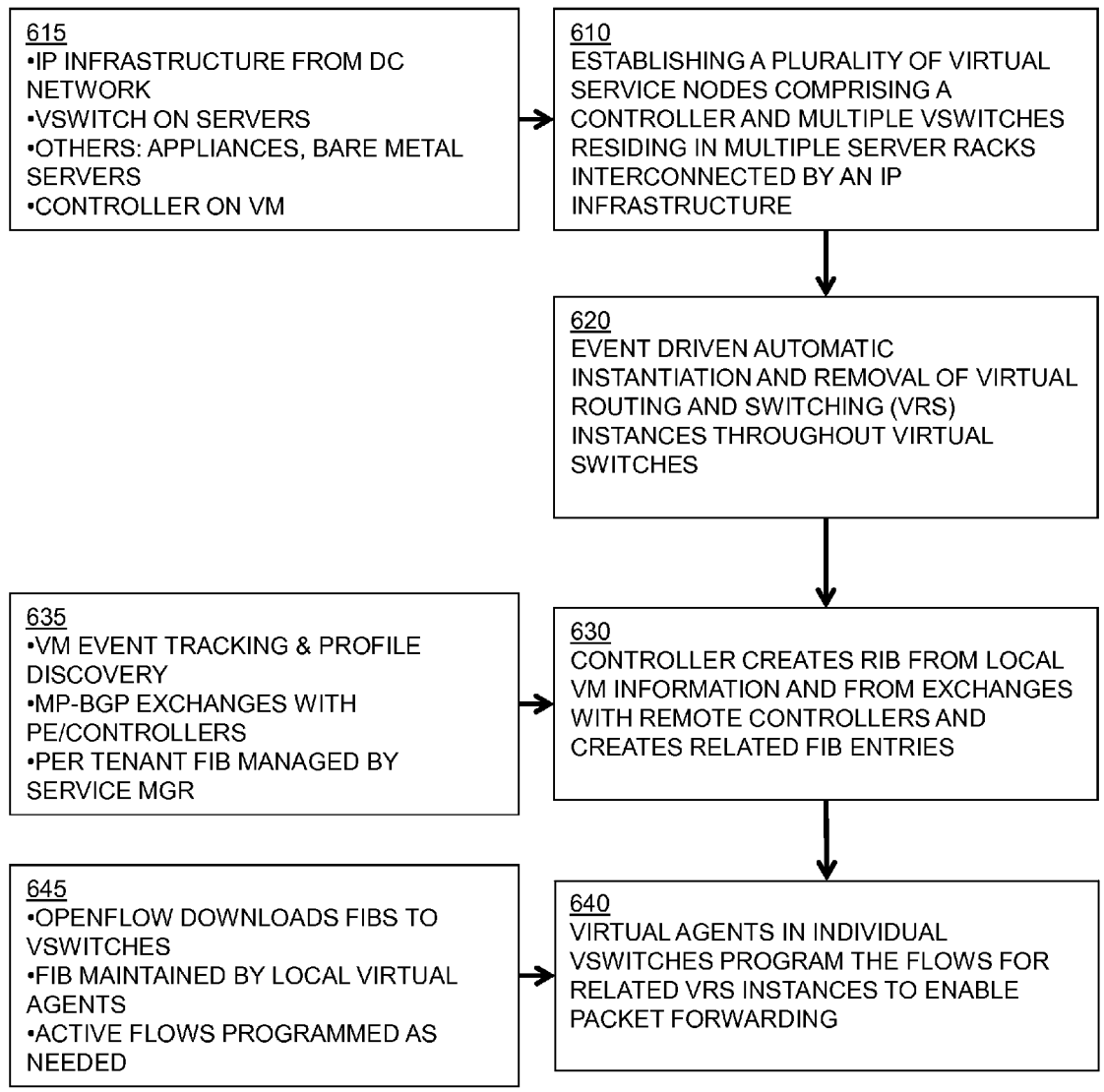
FIG. 6 depicts a flow diagram of a method for enabling dVRS solution according to an embodiment.

FIG. 6 depicts a flow diagram of a method according to an embodiment. Specifically, FIG. 6 depicts a flow diagram of a method 600 for providing virtualized services at a data center (DC).

As previously noted, each virtual service provided to a DC tenant is implemented via VRS formed using multiple instances residing in different Vswitches.

At step 610, a plurality of virtual nodes (VNs) is established, each VN comprising a controller associated with a plurality of virtual switches (VSWs) residing in one or more server racks or resource clusters interconnected by an IP infrastructure. Referring to box 615, in each VN the controller may run in the ToR/Eor or in a centralized VM; the VSWs are instantiated in hypervisors running in servers. An IP infrastructure running in the DC network components (ToRs, EoRs, Core devices) is used as a Virtual Node fabric.

At step 620, virtual routing and switching (VRS) instances are automatically established or removed at one or more of the VSWs as soon as the controller learns of VM events. VM events may comprise VM instantiation, deletion, migration and the like. Though not strictly virtual in nature, the VM events mechanisms depicted herein may also address appliance attachment, detachment and the like, as well as other compute/storage service delivery.

At step 630, each controllers uses the information about its locally attached VMs and the information from exchanges with remote controllers or DC GWs to create a Routing Information Base and related FIB entries. Referring to box 635, MP-BGP control plane is used to feed the service manager with reachability information for remote VNs. For example, VM event tracking & profile discovery is provided using MP-BGP exchanges between the controller and PE devices, while per tenant FIB is managed by a service manager.

At step 640, Virtual Agents in the Vswitches program the forwarding plane to ensure that active VRS flows are handled properly. Referring to box 645, OpenFlow may be used to download FIBs (and other information) from the controller to the Virtual Agents such that the Vswitches are programmed with the necessary forwarding table data to properly route active flows.

Figure 7:
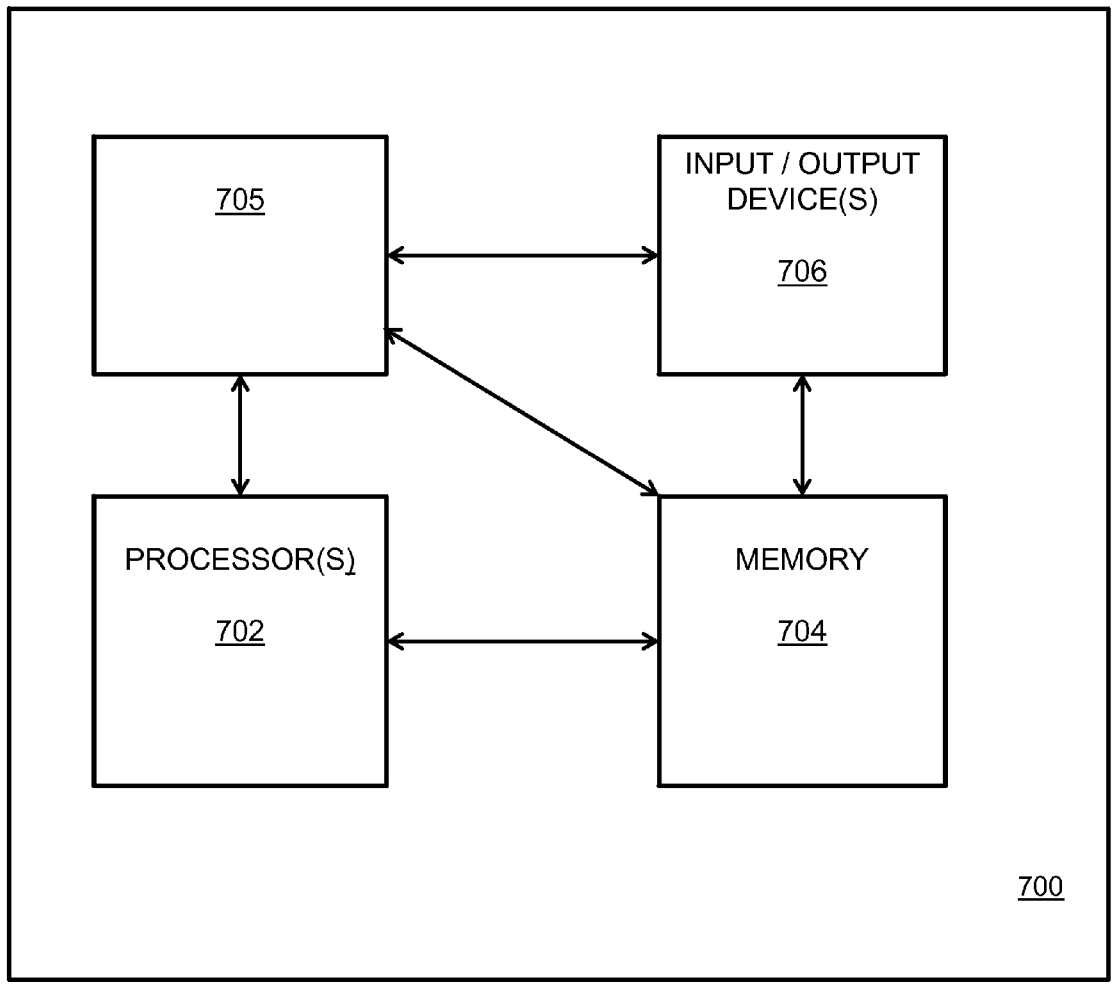
FIG. 7 depicts a high-level block diagram of a computing device suitable for use in performing the functions described herein.

FIG. 7 depicts a high-level block diagram of a computing device such as a processor in a telecom or data center network element, suitable for use in performing functions described herein. Specifically, the computing device 700 described herein is well adapted for implementing the various functions described above with respect to the various data center (DC) elements, network elements, nodes, routers, management entities and the like, as well as the methods/mechanisms described with respect to the various figures.

As depicted in FIG. 7, computing device 700 includes a processor element 703 (e.g., a central processing unit (CPU) and/or other suitable processor(s)), a memory 704 (e.g., random access memory (RAM), read only memory (ROM), and the like), a cooperating module/process 705, and various input/output devices 706 (e.g., a user input device (such as a keyboard, a keypad, a mouse, and the like), a user output device (such as a display, a speaker, and the like), an input port, an output port, a receiver, a transmitter, and storage devices (e.g., a persistent solid state drive, a hard disk drive, a compact disk drive, and the like)).

It will be appreciated that the functions depicted and described herein may be implemented in software and/or in a combination of software and hardware, e.g., using a general purpose computer, one or more application specific integrated circuits (ASIC), and/or any other hardware equivalents. In one embodiment, the cooperating process 705 can be loaded into memory 704 and executed by processor 703 to implement the functions as discussed herein. Thus, cooperating process 705 (including associated data structures) can be stored on a computer readable storage medium, e.g., RAM memory, magnetic or optical drive or diskette, and the like.

It will be appreciated that computing device 700 depicted in FIG. 7 provides a general architecture and functionality suitable for implementing functional elements described herein or portions of the functional elements described herein.

It is contemplated that some of the steps discussed herein as software methods may be implemented within hardware, for example, as circuitry that cooperates with the processor to perform various method steps. Portions of the functions/elements described herein may be implemented as a computer program product wherein computer instructions, when processed by a computing device, adapt the operation of the computing device such that the methods and/or techniques described herein are invoked or otherwise provided. Instructions for invoking the inventive methods may be stored in tangible and non-transitory computer readable medium such as fixed or removable media or memory, transmitted via a tangible or intangible data stream in a broadcast or other signal bearing medium, and/or stored within a memory within a computing device operating according to the instructions.

Although various embodiments which incorporate the teachings of the present invention have been shown and described in detail herein, those skilled in the art can readily devise many other varied embodiments that still incorporate these teachings. Thus, while the foregoing is directed to various embodiments of the present invention, other and further embodiments of the invention may be devised without departing from the basic scope thereof. As such, the appropriate scope of the invention is to be determined according to the claims.

What is claimed is:

1. A method for providing virtualized services at a data center (DC), comprising:
 establishing a plurality of virtual nodes (VNs), each VN comprising a controller, an internet protocol (IP) infrastructure and a plurality of virtual switches (VSWs);
 each VSW being programmed to support a Virtual Routing and Switching (VRS) instance and for storing forwarding information therefor, wherein a virtualized service is provided via a collection of VRS instances interconnected using IP tunnels and L2 or L3 service encapsulations, and
 each controller being adapted to receive virtualized service route information from one or more DC gateways, other remote controllers and from local VSW, to process a required forwarding information base (FIB) and to download toward each VSW a corresponding FIB portion.

2. The method of claim 1, wherein virtualized service information is distributed to each VSW participating in a VRS to enable shortest path routing of traffic between different subnets spread across multiple VSWs.

3. The method of claim 1, wherein the controller uses a multiprotocol border gateway protocol (MP-BGP) to communicate with other VSW controllers, DC gateways (GWs) or external provider edge (PE) devices.

4. The method of claim 1, wherein the controller uses OpenFlow extensions to receive local virtual machine (VM) event information.

5. The method of claim 4, wherein said local VM event information comprises any of a VM instantiation, a VM deletion and a VM migration.

6. The method of claim 1, wherein the controller uses provider edge (PE) Service Manager procedures to consolidate entries from both a multiprotocol border gateway protocol (MP-BGP) and OpenFlow to build per-tenant FIB tables.

7. The method of claim 1, wherein information downloaded in the VSWs is organized to address 5-tuple forwarding for active flows.

8. The method of claim 1, wherein said controller runs in a control plane interaction module (CPIM) of a Top of Rack (ToR) or End of Rack (EoR) switch.

9. The method of claim 1, wherein said controller runs in a virtual machine (VM).

10. The method of claim 1, wherein said controller is adapted to communicate with DC gateway routers using a multiprotocol border gateway protocol (MP-BGP) without intermediate translation of a service encapsulation.

11. The method of claim 1, wherein said controller is adapted to communicate with DC gateway routers using a multiprotocol border gateway protocol (MP-BGP), and to select an intermediate translation of a service encapsulation in accordance with requirements of a remote device.

12. The method of claim 11, wherein said controller is adapted to provide a interface to a policy manager to allow automatic instantiation of services.

13. The method of claim 1, wherein said controller is adapted to provide an interface to allow per service monitoring.

14. An apparatus for providing virtualized services at a data center (DC), the apparatus comprising:
 a processor configured for:
 establishing a plurality of virtual nodes (VNs), each VN comprising a controller, an internet protocol (IP) infrastructure and a plurality of virtual switches (VSWs);
 each VSW being programmed to support a Virtual Routing and Switching (VRS) instance and for storing forwarding information therefor, wherein a virtualized service is provided via a collection of VRS instances interconnected using IP tunnels and L2 or L3 service encapsulations, and
 each controller being adapted to receive virtualized service route information from one or more DC gateways, other remote controllers and from local VSW, to process a required forwarding information base (FIB) and to download toward each VSW a corresponding FIB portion.

15. A tangible and non-transitory computer readable storage medium storing instructions which, when executed by a computer, adapt the operation of the computer to perform a method for providing virtualized services at a data center (DC), the method comprising:
 establishing a plurality of virtual nodes (VNs), each VN comprising a controller, an internet protocol (IP) infrastructure and a plurality of virtual switches (VSWs);
 each VSW being programmed to support a Virtual Routing and Switching (VRS) instance and for storing forwarding information therefor, wherein a virtualized service is provided via a collection of VRS instances interconnected using IP tunnels and L2 or L3 service encapsulations, and
 each controller being adapted to receive virtualized service route information from one or more DC gateways, other remote controllers and from local VSW, to process a required forwarding information base (FIB) and to download toward each VSW a corresponding FIB portion.

16. A non-transitory computer program product wherein computer instructions being stored in a non-transitory computer readable memory, when executed by a processor in a network element, adapt the operation of the network element to provide a method for providing virtualized services at a data center (DC), the method comprising:
 establishing a plurality of virtual nodes (VNs), each VN comprising a controller, an internet protocol (IP) infrastructure and a plurality of virtual switches (VSWs);
 each VSW being programmed to support a Virtual Routing and Switching (VRS) instance and for storing forwarding information therefor, wherein a virtualized service is provided via a collection of VRS instances interconnected using IP tunnels and L2 or L3 service encapsulations, and
 each controller being adapted to receive virtualized service route information from one or more DC gateways, other remote controllers and from local VSW, to process a required forwarding information base (FIB) and to download toward each VSW a corresponding FIB portion.

* * * * *